Dec. 25, 1962  A. T. C. BURROWS  3,070,036
CONVEYORS
Filed Jan. 31, 1961
2 Sheets-Sheet 1
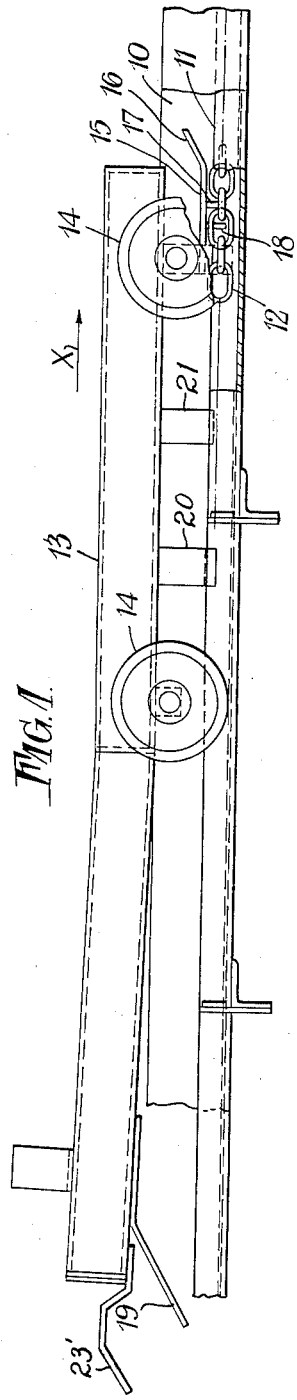
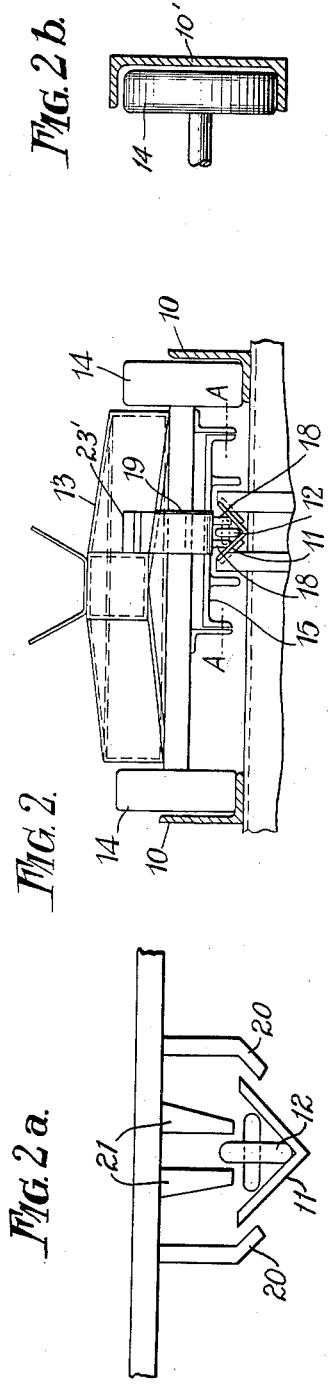

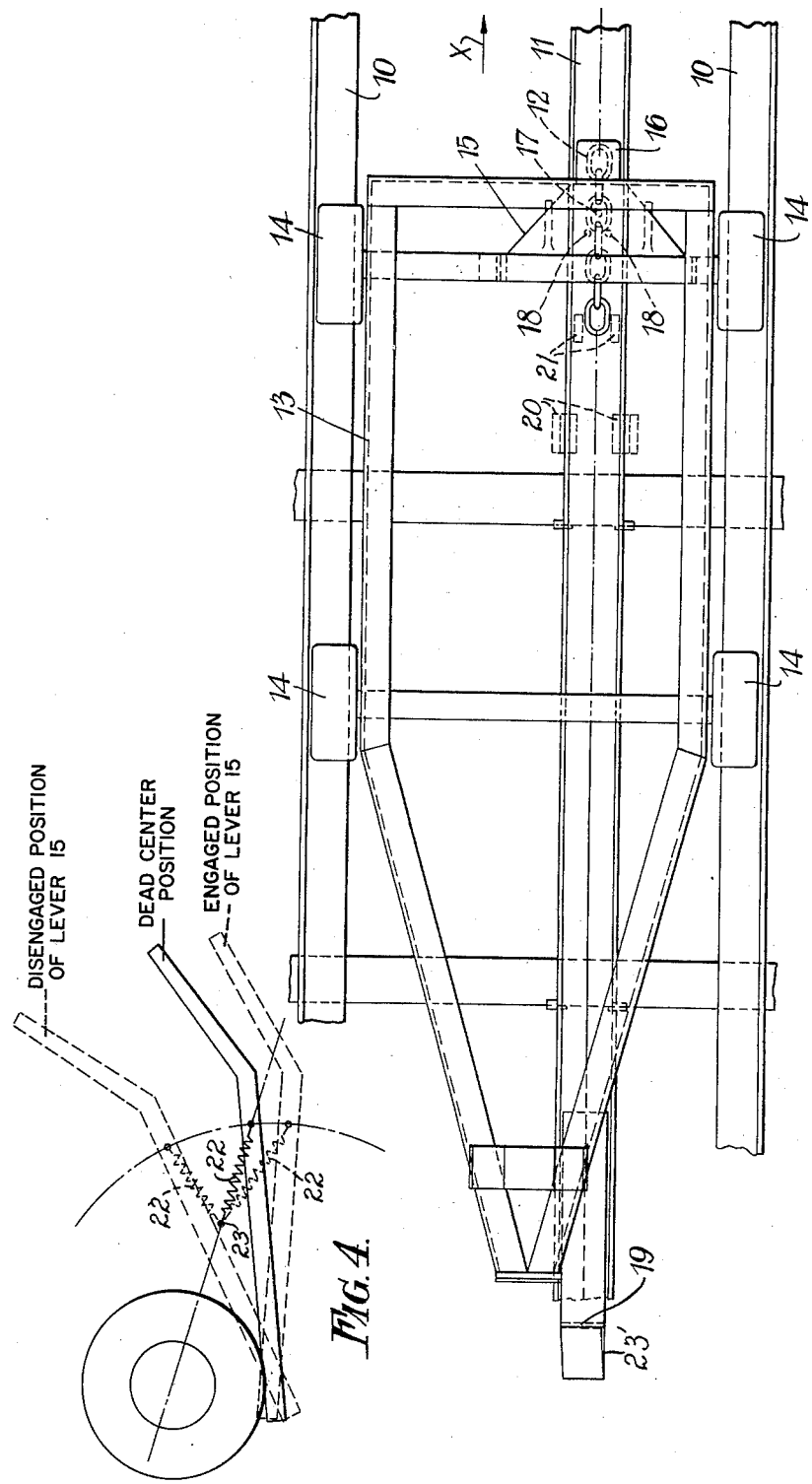

United States Patent Office 3,070,036
Patented Dec. 25, 1962

3,070,036
CONVEYORS
Arthur Thomas Charles Burrows, Stevenage, England, assignor to Geo. W. King Limited, Stevenage, England, a British company
Filed Jan. 31, 1961, Ser. No. 86,057
Claims priority, application Great Britain Feb. 3, 1960
13 Claims. (Cl. 104—172)

This invention relates to conveyor systems of the kind wherein load carrying trucks are caused to move along a predetermined path or track by an endless driven chain which is disposed beneath the trucks.

According to the invention in a conveyor system of the kind set forth each truck is provided with a lever member adapted for pivotal movement, from and into an operative position, about an axis extending transversely to the intended direction of movement of the truck. The conveyor system further comprises means associated with said lever to positively engage the endless driven chain with the lever in operative position to drivingly couple the truck to the chain. Preferably the endless driven chain will be a calibrated or so-called anchor type chain wherein the links are of ring-like shape and are connected in alternating perpendicular fashion. The means includes a depending pin which when said lever member is in its operative position is engaged in a chain link which is disposed in a plane normal or substantially normal to the axis of such pin. Conveniently, the means further includes two further depending pins to straddle or embrace a chain link adjacent the first said link when the lever is in operative position. Preferably each truck will be provided at its rear end with a ramp or cam surface which is so arranged that with two trucks disposed one behind the other, the lever of the rearwardly truck will ride on the ramp or cam surface at the rear of said leading truck thereby to cause upward displacement of said lever member on said second truck and automatic uncoupling thereof from the chain.

In order that the said invention may be clearly understood and readily carried into effect the same will be hereinafter more fully described with reference to the accompanying drawings in which:

FIGURE 1 is a part sectional side elevational view illustrating a load carrying truck in position on a conveyor track, FIGURE 2 is an end elevation view looking from the left of FIGURE 1, FIGURE 2a is an end elevational view of a truck showing a detail thereof on enlarged scale, FIGURE 2b shows a variation of the rail shown in FIG. 2, FIGURE 3 is a plan view of the truck and conveyor track shown in FIGURE 1, and FIGURE 4 is a diagrammatic illustration of the operation of a detail of the truck.

Referring to the drawings 10 denotes two angle section rails which are disposed in spaced parallel relation and together form a conveyor track along which load carrying trucks may be propelled. Located between the rails 10 and extending parallel thereto is a trough or channel 11 of substantially V shape. The channel is adapted to constitute a guide and a support for the upper flight of an endless driven chain 12 which comprises an ordinary calibrated or so-called anchor type chain consisting of alternating perpendicularly arranged links. The lower or return flight of the chain 12 may conveniently be supported in a similar trough or channel disposed vertically below the trough or channel 11 (not shown).

As indicated above the rails 10 serve as a track or runway for a plurality of load trucks one of which is indicated at 13. The truck in the embodiment illustrated is supported on four wheels 14 and is intended for transporting engines of motor vehicles but it is apparent that the general design and intended function of the truck is of no importance and that it may well be of a form and construction different from that actually illustrated. Mounted at the underside of the truck for pivotal movement about axis A—A (FIGURE 2) is a lever member 15 which is of generally triangular shape in plan (as seen in FIG. 3). Member 15 has an upwardly inclined extension 16 at the forward portion thereof which as seen in FIGURES 1 and 3 projects in the direction of travel of the trucks 13 as indicated by the arrow X. Mounted on the member 15 to project downwardly therefrom are three pins arranged in triangular formation. The pin arrangement is such that with said member 15 in the operative position as shown, the foremost pin 17 will project into a chain link which is disposed in a horizontal plane and will thus provide a driving connection between the chain 12 and the truck so that the latter will be moved with said chain. The two rear pins 18 will be disposed at opposite sides of the vertically disposed link adjoining that engaged by the pin 17 and will in addition to serving as guide and locating means also serve to additionally drive the truck by reason of the fact that pins 18 bear against the next adjoining horizontal link on movement of the chain. Preferably the lower ends of the pins 18 will be chamfered as indicated in FIGURE 2 to conform to the trough or channel 11. Conveniently, the lever member 15 will be so mounted as to be capable of limited lateral movement in order to ensure that the pins will engage the chain even if the latter is displaced slightly relatively to the truck.

Mounted at the rear of the truck, in alignment with the extension 16 on the fore part of the lever member 15 is a fixed ramp or cam surface 19.

It will be appreciated if a truck similar to that illustrated is disposed forwardly of truck 13 actually shown and is held stationary then as said truck 13 approaches such stationary truck the forwardly projecting extension 16 will contact and will ride up the fixed ramp or cam surface 19 of the stationary truck thereby causing the lever member 15 to swing upwardly sufficiently to disengage the pins 17, 18 from the chain and thus interrupt the drive to the truck 13. In the event that the foremost truck is subsequently moved to bring its ramp or cam surface 19 out of engagement with the extension 16 the member 15 will drop downwardly under the action of gravity and the pins 17, 18 will then re-engage the chain thereby restoring the drive to the truck. Possibly the ramp or cam surface may be so formed as to include a forwardly extending horizontal portion so that after initial upward displacement of the lever member of a following truck such member will be maintained at a selected height and will not necessarily be forced further upwards.

It will be apparent that appropriate means, e.g. ramp or cam means may be appropriately disposed at one or more points along the conveyor path to actuate the lever member 15 of any selected truck so that the drive thereto may be discontinued or controlled at will regardless of whether or not there is a preceding truck standing stationary in the path of movement of the selected truck.

Although it has been found that the weight of the lever member 15 is sufficient to maintain it in its operative position and also to restore it to such position after each upward displacement, it may be found desirable to provide a spring 22 which will be operative to urge said member into its operative position. The spring 22 is connected at one end to the lever member 15 and at the other end to a point 23 on the truck. Where such a spring is provided, the arrangement may be such that after a predetermined upward displacement of the lever member 15 the spring 22 associated therewith will pass over a dead center position and will be effective to snap said member upwardly into an inoperative or disengaged position wherein pins 17, 18 will be maintained clear of the chain. With such an arrangement it would be convenient to provide at the rear of each truck a second ramp or cam surface 23' spaced above the surface 19 so that when two trucks are stationary one behind the other movement of the forward truck will cause the second ramp or cam surface to cooperate with the forwardly projecting extension 16 and thus cause depression of said lever member 15 sufficiently to bring the spring past its dead center position so that spring 22 would then be effective to restore said lever member to its operative or engaged position with the chain. The above operation is clearly shown in FIGURE 4 wherein the lever is shown in solid lines in the dead center position of the spring and in dotted lines in the engaged and disengaged positions on opposite sides of the dead center position.

In the event that there is any tendency to lifting of the chain during disengagement movement of the lever member 15 it would readily be possible to provide at the underside of the truck downwardly projecting abutments or stripper means 21 with which the chain would engage so that upward movement thereof would be prevented. Furthermore, each truck may be provided with depending brackets 20 adapted to cooperate with the V section trough or channel in which the chain is disposed thereby to prevent any tendency to undesired lifting or upward displacement of the track relatively to the chain. Alternatively the rails on which the wheels of the trucks are adapted to run might be provided with inturned flanges or the like adapted to overlie the tops of the wheels as shown in FIG. 2b by rails 10'.

What is claimed is:

1. A conveyor system comprising a plurality of links connected together in alternating perpendicular fashion to constitute a chain, each link being of ring-like shape to provide an opening therein, a truck rollably supported adjacent said chain, and a lever pivotally supported on the truck for movement between first and second positions, the lever including three pins arranged in triangular fashion thereon, one of said pins being positioned in the opening of one of said links while the other pins abut a link adjacent said one link to connect the rollably supported truck to the chain in driving relation for movement in a first direction while guiding the truck to prevent relative movement between the chain and the truck in a direction transverse of the first direction, the pins being disengaged from the links of said chain with the lever in the second position.

2. A conveyor system comprising a plurality of hollow links connected together alternately in perpendicular relation to one another to constitute a chain, a truck rollably supported adjacent said chain, a lever supported on said truck for pivotal movement towards and away from said chain, three pins projecting in parallel relation from said lever and engaged with said links with the lever pivoted towards said chain, said pins being positioned on said lever so that with one pin engaged in a first link of the chain, the other two pins straddle the link adjacent the first said link whereby said pins couple the truck to the chain in driving relation for advancement in the direction of the chain while guiding the chain and preventing relative lateral movement between the chain and truck.

3. A conveyor system as claimed in claim 2 wherein said pins are arranged on said lever to define a triangle.

4. A conveyor system comprising a chain adapted for being advanced, said chain consisting of alternating perpendicularly arranged ring-like links connected together, a truck rollably supported adjacent said chain, means pivotally coupled to said truck for movement towards and away from said chain, and a plurality of pins on said means for cooperatively engaging said chain with the means pivoted to a position adjacent said chain so that at least one of said pins projects into a first link to be encircled thereby, and at least one other pin cooperates with a link adjacent said first link, so that said chain and truck are guidably connected in driving relation.

5. A conveyor system as claimed in claim 4 wherein said means is a lever extending from said truck in the direction of advancement of the chain.

6. A conveyor system as claimed in claim 5 comprising cam means operatively positioned with respect to said chain and adapted for engaging said lever to pivot the same such that said pins are disengaged from said chain.

7. A conveyor system as claimed in claim 6 wherein said cam means comprises a cam surface attached to said truck at a level corresponding to that of said lever so that with two trucks adjacent one another said cam surface engages said lever to pivot the same so that the pins on the lever are disengaged from said chain.

8. A conveyor system as claimed in claim 7 wherein said truck has opposite ends, said cam surface being coupled to one of the ends of the truck and said lever being coupled to the other of said ends.

9. A conveyor system as claimed in claim 5 comprising a spring between said lever and said truck urging said lever towards said chain to engage said pins and said chain in driving relation.

10. A system as claimed in claim 9 wherein said spring has a dead center position such that with said lever pivoted in a direction away from said chain beyond said dead center position said lever is urged by said spring to a position in which the pins are disengaged from said chain.

11. A system as claimed in claim 10 comprising a further cam surface on said truck for engaging said lever with the abutting trucks moving away from one another to cause pivotal movement of said lever towards said chain causing said spring to pass the dead center position thereof whereby said spring urges said lever towards said chain to engage the pins and said chain in driving relation.

12. A system as claimed in claim 5 comprising stripper means extending from said truck for engaging said chain to prevent lifting thereof towards said truck.

13. A system as claimed in claim 5 comprising guide means for guidably supporting the chain, and means on said truck for engaging said guide means for preventing relative movement between said chain and said truck.

References Cited in the file of this patent

UNITED STATES PATENTS

| | | |
|---|---|---|
| 401,352 | Hosea | Apr. 16, 1889 |
| 712,570 | Myers | Nov. 4, 1902 |
| 1,000,107 | Morris | Aug. 8, 1911 |
| 1,420,115 | Lange | June 20, 1922 |
| 2,391,173 | Loftus et al. | Dec. 18, 1945 |
| 2,885,969 | Kay et al. | May 12, 1959 |